Patented Feb. 9, 1954

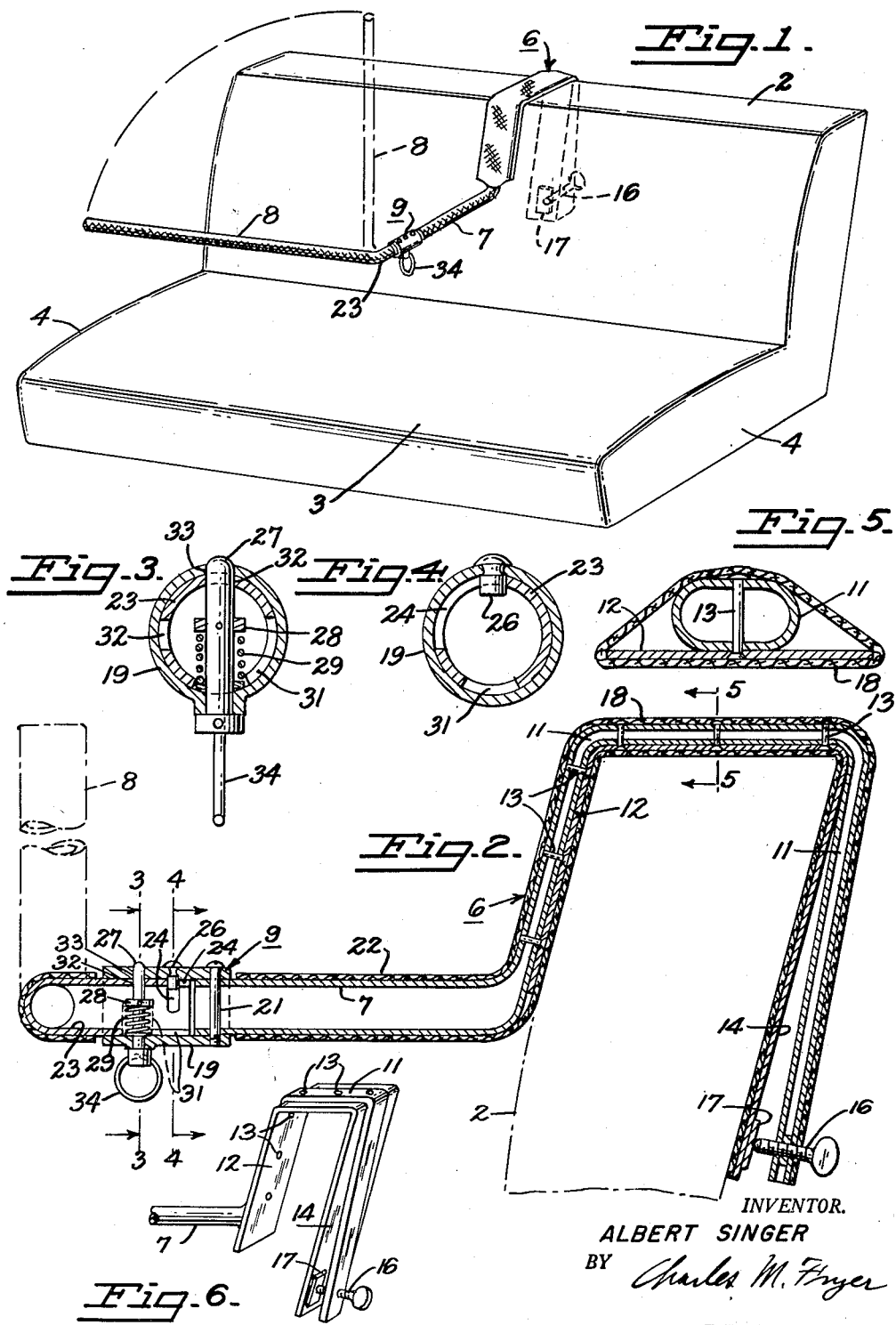

2,668,583

UNITED STATES PATENT OFFICE 2,668,583

AUTOMOBILE SEAT SAFETY GUARD

Albert Singer, Berkeley, Calif.

Application September 24, 1951, Serial No. 247,932

7 Claims. (Cl. 155—189)

This invention relates to an automobile safety guard, and more particularly to a guard which is adapted to be detachably mounted on a seat of an automobile to prevent a passenger from flying forward and injuring himself as a result of sudden application of brakes or impact of the automobile against another object.

The device in question is especially useful for protecting a passenger in the front seat of an automobile sitting next to the driver because in many instances, at such location, sudden application of the brakes or sudden impact with another object causes the passenger to fly against the windshield where the chances of injury are greater as a result of broken glass. However, the device has utility when employed with the rear seat of an automobile even though in such seat the possibility of injury to the passenger is not as great under the circumstances described.

Summarizing the invention, the guard comprises a guard bar which is spaced forwardly with respect to the back rest of the automobile seat, and it is adapted normally to extend lengthwise of the back rest of the seat in a substantially horizontal position. A passenger may thus sit in back of the bar which protects him from flying forward under the conditions noted. Means is provided for mounting the bar for pivotal or swinging movement along an upright plane, from the guarding position in front of the passenger to an upright position and vice versa. Such mounting of the bar permits the passenger to seat himself readily; and at the same time, movement of the bar along an upright plane avoids interference with parts of the automobile which might otherwise obtain were the bar to swing horizontally.

From the preceding, it is seen that my invention has as its objects, among others, the provision of an improved guard which will readily protect the passenger, is of simple and inexpensive construction, can be manipulated without striking parts of the automobile, and which can be readily detachably mounted on or disconnected from an automobile seat.

Referring to the drawings:

Fig. 1 is an isometric view of the safety guard detachably connected to the back rest of an automobile seat; the view illustrating in phantom lines the position of the guard bar for permitting the passenger to seat himself.

Fig. 2 is a vertical longitudinal sectional view through the guard; such view illustrating in phantom lines the position of the guard bar for permitting the passenger to seat himself readily and also depicting the guard detachably supported on the back rest of the seat which is shown schematically.

Fig. 3 is a vertical section in a plane indicated by line 3—3 in Fig. 2.

Fig. 4 is a vertical section taken in a plane indicated by line 4—4 in Fig. 2.

Fig. 5 is a vertical section taken in a plane indicated by line 5—5 in Fig. 2.

Fig. 6 is a fragmentary isometric view illustrating the construction of the bracket for detachably mounting the guard on the back rest of the automobile seat.

Referring to Fig. 1, the automobile seat illustrated comprises back rest 2 and seat cushion 3; the sides of the seat being indicated at 4. The safety guard comprises a U-shaped bracket 6 adapted to be detachably mounted over the top of back rest 2 at a central portion of the back rest between sides 4 of the seat. Connected to bracket 6 is a side bar 7 which extends forwardly from adjacent back rest 2. A guard bar 8 is pivotally connected to side bar 7, adjacent the front end thereof by pivotal connecting means 9 to be subsequently described in detail, for swinging movement about the axis of side bar 7 and along an upright plane from a horizontal guarding position in front of the passenger to an upright position indicated by the phantom lines and vice versa.

It will be noted that the pivotal mounting means or connection 9 is adjacent the inner end of guard bar 8 in the guarding or horizontal position thereof, so that when the guard bar is moved to permit the passenger to enter his seat, it swings away from a side 4 of the seat, thereby obviating interference which might otherwise obtain were the bar to swing to the side of the seat and consequently the side of the vehicle. Also because the guard bar swings along an upright plane, there is no interference to its movement from a guarding position to the upright position, and vice versa. In this connection, the seat illustrated in Fig. 1 is the front seat; and the driver's side is at the right looking at the view.

U-shaped bracket 6 is, preferably, formed of flattened metal tubing 11 to provide for stability when the bracket is mounted over the back rest. To enhance stability, a relatively narrow U-shaped strip 12 of any suitable metal, is positioned on the underside of tubing 11, being secured to the front leg of tubing 11 and to the top extending over the back rest, by any suitable means, such as rivets 13. Rear leg 14 of strip 12 extends lengthwise of the rear leg of the bracket, and is not secured rigidly to such rear leg but is movably connected thereto to provide a convenient mode for clamping the bracket to the back rest of the seat without damaging the same.

For effecting the clamping, a manually turnable screw 16 is threaded in the rear leg of the bracket adjacent the bottom thereof to apply pressure to rear leg 14 of strip 12 to hold it against the back rest 2. To reinforce strip 14 at the portion thereof where screw 16 is adapted to apply pressure, a metal pad 17 is secured to leg 14 by any suitable means, such as welding. Preferably, the entire bracket 6 is enveloped with any suitable fabric 18 to effect a sightly appearance.

Side bar 7 is also preferably a metal tube and is preferably rounded, being secured to the lower end of the front leg of bracket 6 by any suitable means, such as welding. The bar extends forwardly from the bracket in a substantially horizontal position. To the front end of side bar 7 is secured a sleeve 19 by means of screw 21; sleeve 19 forming a journal for pivotal connection of guard bar 8. Side bar 7 is also preferably covered with fabric 22.

Sleeve 19 projects forwardly beyond the outer end of side bar 7; and guard bar 8 is journalled in such forwardly projecting portion of sleeve 19. For this purpose, guard bar 8 has an elbow portion 23 at a right angle with respect to the guarding portion of such bar; elbow portion 23 being journalled in sleeve 19. The end of elbow portion 23 is provided with a bayonet type, L-shaped slot 24, the longitudinal leg of which is open toward the end of portion 23; and a pin 26 is fixed on sleeve 19 to engage in slot 24. The transverse portion of slot 24 is made just long enough so that the respective ends of such transverse portion provide abutments or stops for limiting movement of guard bar 8 at both the horizontal guarding position thereof, and at the upright position when the passenger is to be seated.

Latching means is provided for selectively holding guard bar 8 in either the guarding position or the upright position. With particular reference to Figs. 2 and 3, it will be noted that sleeve 19 has a spring pressed latching pin 27 extending therethrough and which is slidably mounted transversely of the sleeve. Pin 27 has a collar 28 secured thereto; and a spring 29 is interposed between collar 28 and the inside of sleeve 19 to thrust pin 27 resiliently upwardly; the elbow portion 23 of the guard bar being provided with an L-shaped slot 31 for clearing pin 27 and spring 29 to permit the spring to bear against the sleeve, and at the same time allow turning movement of the guard bar and insertion of elbow 23 into sleeve 19 past the spring.

Also elbow portion 23 of the guard bar is provided with a pair of apertures 32 spaced 90° apart; and sleeve 19 is provided with a single aperture 33 adapted to match with either of apertures 32. A ring 34 is connected to the under side of pin 27 to enable pin 27 to be pulled downwardly against the action of the spring. Thus, by pulling pin 27 downwardly, guard bar 8 can be turned to either of the described positions with either of apertures 32, as the case may be, registering with aperture 33. When the registry is obtained at the desired position, pin 27 is released; and spring 29 serves to thrust pin 27 into engagement with the registered apertures to hold the guard bar at the desired position. Guard bar 8 is, preferably, of metal tubing; and as indicated in Fig. 1, it is also preferably covered with fabric.

The described safety guard can be quickly and easily attached; and because of the simple bracket arrangement, it can be mounted at any suitable position over the back rest of the seat to suit the convenience of the individual.

I claim:

1. An automobile seat safety guard comprising a guard bar spaced forwardly with respect to the back rest of the seat whereby a passenger can sit in said seat in back of said bar, a side bar supported by and extending forwardly from adjacent the back rest of said seat between the sides of the seat, means pivotally connecting said guard bar on said side bar adjacent the front end of said side bar for movement along an upright plane from a guarding position in front of said passenger to an upright position and vice versa, and means for supporting said side bar.

2. An automobile seat safety guard comprising a guard bar for a passenger sitting in said seat in back of said bar, a side bar, means pivotally connecting said guard bar to said side bar adjacent the front end of said side bar for movement along an upright plane from a guarding position in front of said passenger to an upright position and vice versa, and a U-shaped bracket connected to the rear of said side bar adapted to be positioned over the back rest of said seat for detachably supporting said guard on said seat.

3. An automobile seat safety guard comprising a guard bar for a passenger sitting in said seat in back of said bar, a side bar, means pivotally connecting said guard bar to said side bar adjacent the front end of said side bar for movement along an upright plane from a guarding position in front of said passenger to an upright position and vice versa, a U-shaped bracket connected to the rear of said side bar adapted to be positioned over the back rest of said seat for detachably supporting said guard on said seat, and means for clamping said bracket to said back rest.

4. An automobile seat safety guard adapted to be detachably mounted on the back rest of the seat comprising a guard bar, a side bar extending transversely with respect to the guard bar, means connecting the guard bar to the side bar adjacent one end of the side bar for pivotal movement about the axis of said side bar whereby said guard bar can be moved from a guarding position in front of a passenger sitting in said seat to an upright position and vice versa, stops for limiting movement of said guard bar at both said positions, and a U-shaped bracket connected to the opposite end of said side bar adapted to be positioned over the back rest of said seat for detachably supporting said guard on said seat.

5. An automobile seat safety guard adapted to be detachably mounted on the back rest of the seat comprising a guard bar, a side bar extending transversely with respect to the guard bar, means connecting the guard bar to the side bar adjacent one end of the side bar for pivotal movement about the axis of said side bar whereby said guard bar can be moved from a guarding position in front of a passenger sitting in said seat to an upright position and vice versa, stops for limiting movement of said guard bar at both said positions, latching means for holding said guard bar at both said positions, a U-shaped bracket connected to the opposite end of said side bar adapted to be positioned over the back rest of said seat for detachably supporting said guard on said seat, a strip extending lengthwise of and movably connected to the rear leg of said bracket, and a screw threaded in said rear leg to apply pressure to said strip for clamping the bracket to said back rest.

6. An automobile seat safety guard comprising mounting means attached to the back rest of the seat at a position spaced inwardly from each of the sides of the seat so that the mounting means is between the sides of the seat, a single side bar between said seat sides fixedly attached at its rear end to said mounting means and extending forwardly from said mounting means, a guard bar extending transversely with respect to said side bar with one end thereof adjacent a side of the seat in the guarding position of said guard bar, and means pivotally connecting the opposite end of said guard bar to the front end of said side bar for swinging movement in an upright plane from the guarding position to an upright position between the seat sides and vice versa.

7. An automobile seat safety guard comprising a U-shaped bracket, means detachably clamping said bracket over the back rest of the seat at a position spaced inwardly from each of the sides of the seat so that the bracket is between the sides of the seat, a single side bar between said seat sides fixedly attached at its rear end to said bracket and extending forwardly from said bracket, a guard bar extending transversely with respect to said side bar with one end thereof adjacent a side of the seat in the guarding position of said guard bar, and means pivotally connecting the opposite end of said guard bar to the front end of said side bar for swinging movement in an upright plane from the guarding position to an upright position between the seat sides and vice versa.

ALBERT SINGER.

References Cited in the file of this patent

UNITED STATES PATENTS

| Number | Name | Date |
| --- | --- | --- |
| 372,325 | Parish | Nov. 1, 1887 |
| 1,049,080 | Greene | Dec. 31, 1912 |
| 1,405,309 | Matthews | Jan. 31, 1922 |
| 1,973,011 | Morrison | Sept. 11, 1934 |
| 2,244,650 | Curran et al. | June 3, 1941 |
| 2,349,109 | O'Keeffe | May 16, 1944 |
| 2,592,702 | Sprung | Apr. 15, 1952 |
| 2,592,879 | Eyerly | Apr. 15, 1952 |